Patented June 21, 1932

1,863,647

UNITED STATES PATENT OFFICE

LOUIS BENDA, OF MAINKUR, NEAR FRANKFORT-ON-THE-MAIN, AND OTTO SIEVERS, OF HOHE TANNE, NEAR HANAU-ON-THE-MAIN, GERMANY, ASSIGNORS TO WINTHROP CHEMICAL COMPANY, INC., OF NEW YORK, N. Y., A CORPORATION OF NEW YORK

PRODUCTION OF ALKOXY ACRIDINIUM COMPOUNDS AND THE PRODUCTS

No Drawing. Application filed March 6, 1928, Serial No. 259,601, and in Germany March 15, 1927.

The present invention relates to a new process of preparing alkoxyacridinium compounds and a new product prepared thereby.

Whereas hydroxyacridines by treatment with alkylating agents in the presence of acid-binding substances are converted into the O-alkylethers (cf. Patent No. 1,715,332, dated May 28, 1929, in the name of Louis Benda and Werner Schmidt), only the nitrogen atom and not the hydroxy groups in the molecule of hydroxyacridines is alkylated, if the alkylation is carried out in the absence of acid binding agents (cf. U. S. Patent 1,565,891).

Now we have found, that in a single operation alkoxyacridinium compounds are obtained by starting from a hydroxyacridine and effecting the alkylation with at least the theoretical amount of an alkylating agent calculated for the alkylation of the hydroxy groups as well as of the ring nitrogen atom, in the presence of an amount of an acid binding substance sufficient for saturating the hydroxy groups to be alkylated.

Advantageously one may use the potassium salts in presence of a little water. The alkoxyacridinium compounds are obtained with an excellent yield, which is a surprising fact, as in the process of alkylating hydroxyacridines as described in the Patent No. 1,715,332 above referred to always byproducts in a considerable amount are formed.

Our new process is of technical importance, because the steps of separating and purifying the alkoxyacridines which are intermediates in the former combined process (see above), which steps involve great losses of material and consume considerable time, are avoided thereby.

The following examples illustrate our invention, the parts being by weight and all temperatures in centigrade degrees. But we wish it to be understood that we are not limited to the particular products nor reaction conditions mentioned therein.

*Example 1.*—Into a mixture of 1.8 parts of caustic potash and 1 part of water, while warming, 3.4 parts of 3.6-dihydroxyacridine are introduced. The temperature is increased to about 120° C. and 9 parts of paratoluenesulfonic acid methyl ester are added carefully. When the violent reaction has subsided, about 6 parts of sodium chloride are introduced and the mass is carefully diluted with about 30 parts of water, at once a violent foaming of the mass taking place. After stirring for about three hours the brown solution is cooled down and allowed to stand in a suitable crystallizer. The reaction product separates as a dark brown substance which is filtered. By adding salt to the filtrate further amounts of the precipitate are obtained. The filtered product may be purified by redissolving it in water with addition of animal charcoal. The 3.6-dimethoxy-10-methylacridinium chloride of the formula

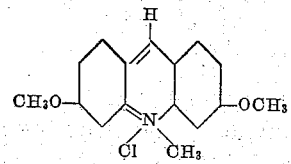

thus obtained is identical with the product described in Example 1 of U. S. Patent 1,565,891.

The corresponding ethyl compound may be produced in a corresponding manner.

*Example 2.*—10.5 parts of 3.6-dihydroxyacridine are dissolved in 5.6 parts of caustic potash and 10 parts of hot water. Then slowly, while well stirring, 12.5 parts of ethylenechlorhydrine are allowed to flow in. When the reaction is finished the mass is heated for a short time on the water bath, acidified with concentrated hydrochloric acid and then cooled. The precipitate formed is filtered. By repeated recrystallization from water with addition of animal charcoal and some drops of hydrochloric acid, the new compound of the probable formula

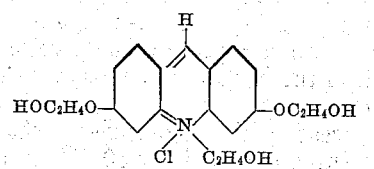

is obtained in the form of yellow needles, soluble in water, methyl- and ethyl alcohol, glacial acetic acid, less soluble in acetone and acetic acid ester and almost insoluble in benzene, benzine and ether.

We claim:

1. As a new compound the 3.6-dihydroxyethoxy-10-hydroxyethylacridiniumchloride of the formula:

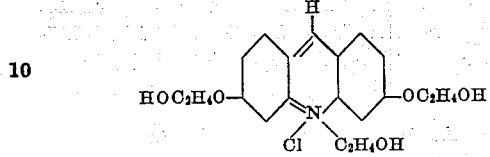

being in a pure state yellow needles, soluble in water, methyl- and ethylalcohol, glacial acetic acid, less soluble in acetone and acetic acid ester and almost insoluble in benzene, benzine and ether.

2. Process which comprises heating an alkali metal salt of a hydroxy-acridine compound with an alkylating agent of the group consisting of arylsulfonic acid methyl esters and 1-hydroxy-2-chloro-ethane in an amount at least sufficient for alkylating the hydroxy groups and the nitrogen atom.

3. Process which comprises heating an alkali metal salt of 3.6-dihydroxy-acridine with an alkylating agent of the group consisting of arylsulfonic acid methyl esters and 1-hydroxy-2-chloro-ethane in an amount at least sufficient for alkylating the hydroxy groups and the nitrogen atom.

4. Process which comprises heating to temperatures above about 50° C. and not exceeding substantially about 150° C. an alkali metal salt of 3.6-dihydroxy-acridine with an alkylating agent of the group consisting of arylsulfonic acid methyl esters and 1-hydroxy-2-chloro-ethane in an amount at least sufficient for alkylating the hydroxy groups and the nitrogen atom.

5. Process which comprises heating to temperatures above about 50° C. and not exceeding substantially about 150° C. an alkali metal salt of 3.6-dihydroxy-acridine, in the presence of a little water, with an alkylating agent of the group consisting of arylsulfonic acid methyl esters and 1-hydroxy-2-chloro-ethane in an amount at least sufficient for alkylating the hydroxy groups and the nitrogen atom.

6. Process which comprises heating to temperatures above about 50° C. and not exceeding substantially about 150° C. the potassium salt of 3.6-dihydroxy-acridine, in the presence of a little water, with an alkylating agent of the group consisting of arylsulfonic acid methyl esters and 1-hydroxy-2-chloroethane in an amount at least sufficient for alkylating the hydroxy groups and the nitrogen atoms.

7. Process which comprises heating to temperatures above about 50° C. and not exceeding substantially about 150° C. the potassium salt of 3.6-dihydroxy-acridine, in the presence of a little water, with 1-hydroxy-2-chloro-ethane in an amount at least sufficient for alkylating the hydroxy groups and the nitrogen atom.

In testimony whereof we affix our signatures.

LOUIS BENDA.
OTTO SIEVERS.